United States Patent
Miyoshi

(10) Patent No.: US 7,267,194 B2
(45) Date of Patent: Sep. 11, 2007

(54) AUTOMOTIVE PEDAL SUPPORT STRUCTURE

(75) Inventor: Keisuke Miyoshi, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 333 days.

(21) Appl. No.: 10/863,287

(22) Filed: Jun. 9, 2004

(65) Prior Publication Data

US 2005/0045406 A1 Mar. 3, 2005

(30) Foreign Application Priority Data

Aug. 26, 2003 (JP) .............................. 2003-301791

(51) Int. Cl.
*B60K 28/10* (2006.01)
*G05G 1/14* (2006.01)

(52) U.S. Cl. ........................................ 180/274; 74/512

(58) Field of Classification Search ............... 180/274; 74/512, 513

See application file for complete search history.

(56) References Cited

U.S. PATENT DOCUMENTS

| 5,848,558 | A | * | 12/1998 | Isono et al. ................... 74/512 |
| 6,041,674 | A | * | 3/2000 | Kato ........................... 74/512 |
| 6,070,488 | A | * | 6/2000 | Yabusaki et al. ............. 74/512 |
| 6,076,422 | A | * | 6/2000 | Tabata ......................... 74/512 |
| 6,089,342 | A | * | 7/2000 | Muller et al. ............... 180/274 |
| 6,176,340 | B1 | * | 1/2001 | Mizuma et al. ............. 180/274 |
| 6,539,823 | B1 | * | 4/2003 | Tomono et al. ............... 74/512 |
| 6,655,489 | B2 | * | 12/2003 | Kawai et al. ............... 180/274 |
| 6,742,411 | B2 | * | 6/2004 | Aoki et al. ................... 74/512 |
| 6,808,040 | B2 | * | 10/2004 | Hayashihara et al. ....... 180/315 |
| 7,066,047 | B2 | * | 6/2006 | Amano et al. ................ 74/512 |
| 2002/0020248 | A1 | * | 2/2002 | Miyoshi et al. .............. 74/512 |
| 2003/0019319 | A1 | * | 1/2003 | Mizuma ...................... 74/560 |
| 2004/0020324 | A1 | | 2/2004 | Jemmeson et al. |

FOREIGN PATENT DOCUMENTS

| JP | 09-216528 | 8/1997 |
| JP | 2001-219828 | 8/2001 |
| JP | 2002-087226 | 3/2002 |
| JP | 2002-087227 | 3/2002 |
| JP | 2003-212101 | 7/2003 |

OTHER PUBLICATIONS

European Search Report dated May 18, 2005 Application No. EP 04 01 6729.
Notice of Reasons for Rejection dated Nov. 21, 2006.

* cited by examiner

Primary Examiner—Paul N. Dickson
Assistant Examiner—Laura B. Freedman
(74) Attorney, Agent, or Firm—Nixon Peabody LLP; Donald R. Studebaker

(57) ABSTRACT

A second pedal bracket 25 that supports a brake pedal 11 by a pedal support shaft 27 is swingably connected, via a bracket support shaft 28, to an upper part of a first pedal bracket 20 fixed to a dashpanel 3. Both the first and second pedal brackets 20 and 25 and a restricting/derestricting member 32 are connected to each other by a bolt 37 to restrict swinging of the second pedal bracket 25. Upon collision of an automobile, a rear end wall 39 of the restricting/derestricting member 32 abuts against an instrument member 7, thus moving the member 32 and bolt 37 relatively forward to derestrict the second pedal bracket 25. Then, an arm 40 extended upward from the second pedal bracket 25 abuts against the instrument member 7, thus rotating the second pedal bracket 25 to displace the pedal support shaft 27 backward.

2 Claims, 6 Drawing Sheets

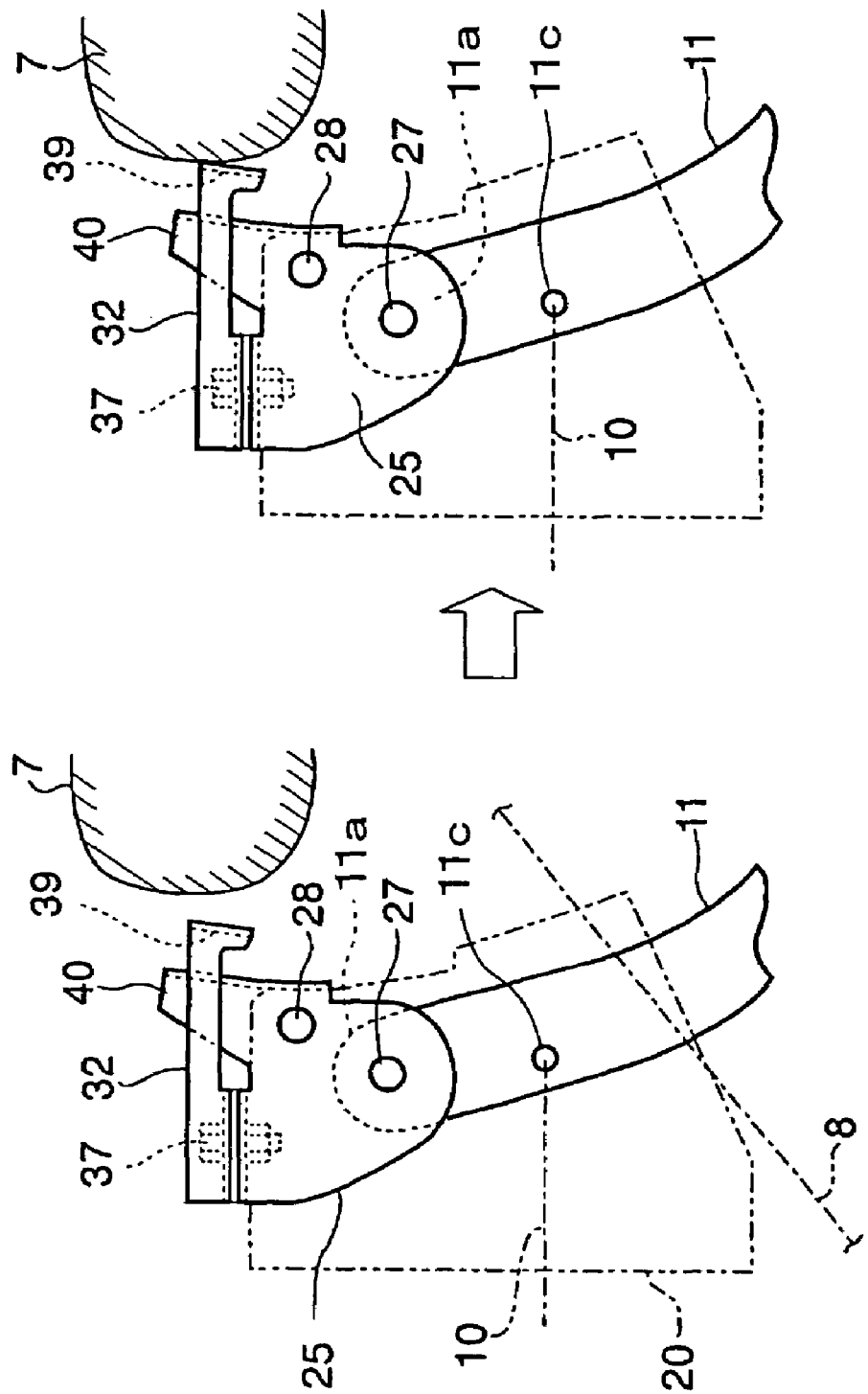

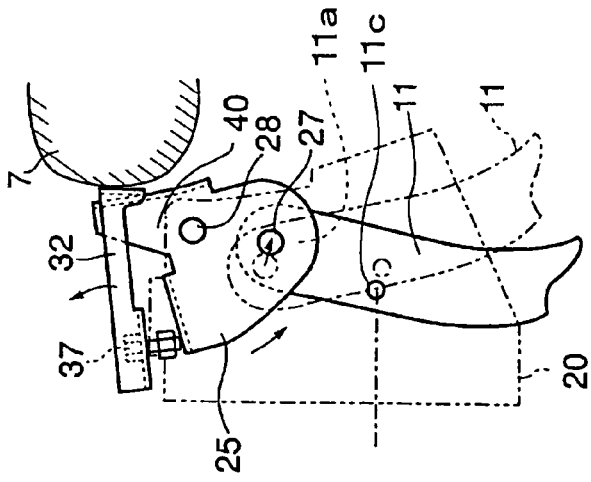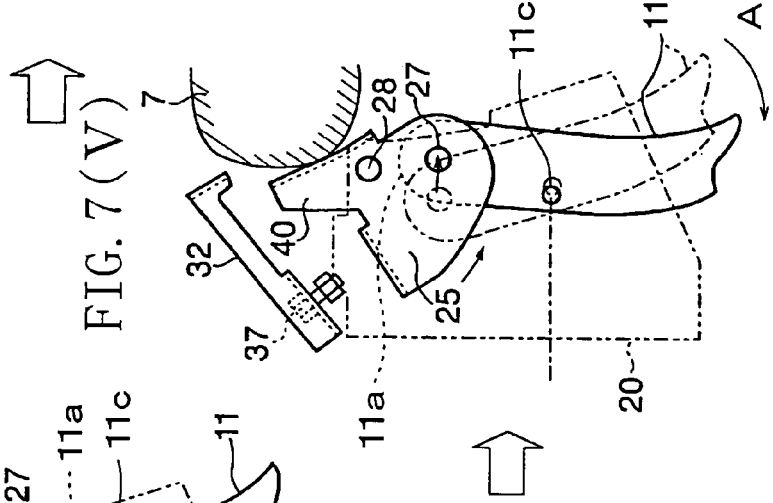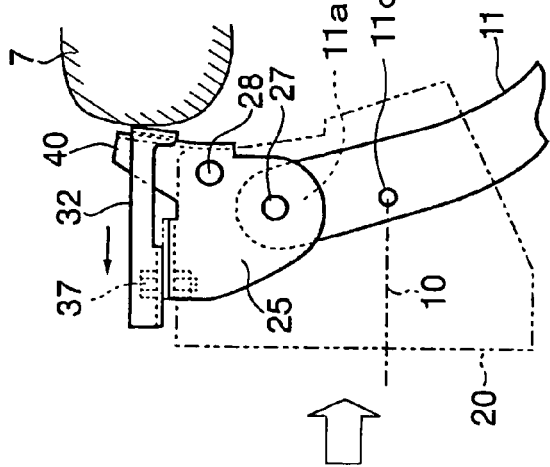

AUTOMOTIVE PEDAL SUPPORT STRUCTURE

BACKGROUND OF THE INVENTION (1) Field of the Invention

The present invention relates to pedal support structures for supporting operating pedals (typically, brake pedals) disposed in foot spaces of driver's seats.

(2) Background Art

Various techniques for safety measures are now being adopted in automobiles in order to protect drivers from collision. As an example of those techniques, there is a technique for avoiding application of an excessive collision load on a knee of a driver who is stepping on an operating pedal. According to this technique, as disclosed in Patent Document 1 (Japanese Unexamined Patent Publication No. 9-216528) and Patent Document 2 (Japanese Unexamined Patent Publication No. 2001-219828), a pedal support structure is designed such that when a dashpanel is deformed backward upon collision, a pivot of an operating pedal, i.e., a pedal support shaft, is forced to be displaced relatively backward.

In the pedal support structure proposed in Patent Document 1, a pedal bracket is provided with a rotation link that can put the pedal support structure into: an initial state in which the rotation shaft of the operating pedal is located at a forward position; and a second state in which the rotation shaft is located at a backward position. When the dashpanel is deformed backward, the rotation link is rotated due to its interference with an instrument member, thereby putting the pedal support structure, which has been in the initial state, into the second state.

In the pedal support structure proposed in Patent Document 2, in addition to a first pedal bracket fastened to the dashpanel, a second pedal bracket for rotatably supporting the operating pedal is prepared. This second pedal bracket is connected to the first pedal bracket, and is pivotably supported to the first pedal bracket at a position below the rotation shaft of the operating pedal. When the dashpanel is deformed backward, the second pedal bracket is detached from the first pedal bracket. Thus, the second pedal bracket is swung on the pivotal point to the first pedal bracket, and the pivot of the operating pedal, i.e., the pedal support shaft, is forced to be displaced relatively backward.

SUMMARY OF THE INVENTION

The aforementioned pedal support structures relate to the techniques for safety measures as described above, and therefore, it is important to ensure operational reliability.

In view of the above, an object of the present invention is to provide an automotive pedal support structure that can ensure operational reliability.

Specifically, the present invention provides an automotive pedal support structure in which an operating pedal is attached via brackets to a dashpanel serving as a partition between an engine room and a cabin, characterized by including:

a first pedal bracket fixed to the dashpanel;

a bracket support shaft provided at an upper part of the first pedal bracket to extend in a widthwise direction of an automobile;

a second pedal bracket swingably attached to the first pedal bracket via the bracket support shaft;

a pedal support shaft that is provided at the second pedal bracket and located below the bracket support shaft and above a portion of a steering shaft intersecting the operating pedal, in particular, in side view to extend parallel to the bracket support shaft;

the operating pedal swingably attached to the second pedal bracket via the pedal support shaft; and a locking device (restricting means) that connects the first pedal bracket with the second pedal bracket to restrict the swinging of the second pedal bracket, and that derestricts the swinging of the second pedal bracket by abutting against a component of the automobile body when the dashpanel is deformed backward upon collision of the automobile.

Therefore, the present invention releases the second pedal bracket from the first pedal bracket when the dashpanel is deformed backward due to collision, and thus the second pedal bracket is allowed to freely rotate about the bracket support shaft, enabling the operating pedal to be displaced. As a result, it becomes possible to protect a knee of a driver from a collision load.

Besides, according to the present invention, the bracket support shaft is located above the pedal support shaft. Therefore, even if the steering shaft of the steering wheel which extends through a comparatively low position in the vicinity of the dashpanel is somewhat deformed upon collision, there is no possibility that the steering shaft and the bracket support shaft might interfere with each other, and thus it is possible to avoid the situation where this interference prevents the swinging of the second pedal bracket. Consequently, it is possible to ensure the operational reliability of the inventive pedal support structure.

It is preferable that the second pedal bracket has an arm for allowing the swinging of the second pedal bracket by abutting against the automobile body component when the dashpanel is deformed backward.

Furthermore, it is preferable that the arm is located toward the front of the automobile body away from an abutment part of the restricting means which abuts against the automobile body component, and after the restricting means has derestricted the second pedal bracket, the arm allows the swinging of the second pedal bracket by abutting against the automobile body component.

Other features, aspects, and advantages of the present invention will become apparent from the following description of the invention which refers to the accompanying drawings.

BRIEF DESCRIPTION OF THE DRAWINGS

FIG. 6 shows diagrams for illustrating how the pedal support structure operates upon collision.

FIG. 7 shows diagrams for illustrating how the pedal support structure operates upon collision.

DESCRIPTION OF THE PREFERRED EMBODIMENTS

Figure 1:
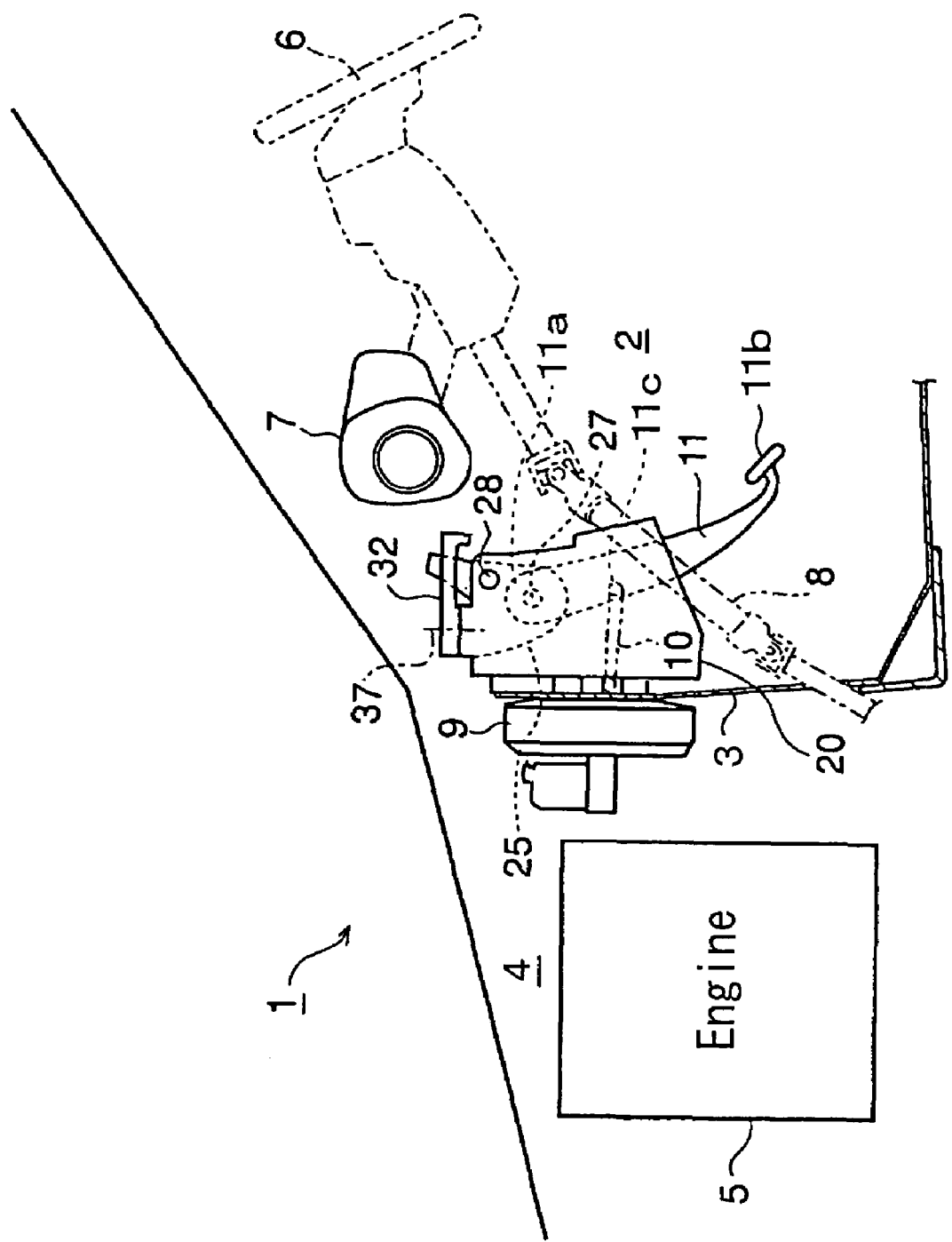
FIG. 1 is a schematic view illustrating the structure of a front section of an automobile provided with a pedal support structure according to an embodiment of the present invention.

FIG. 1 is a diagram for illustrating a driver's seat of an automobile and the structure of the associated section of the automobile in which a pedal support structure according to an embodiment of the present invention is applied.

As shown in FIG. 1, an automobile 1 includes a cabin 2 and an engine room 4. The engine room 4 is disposed in front of the cabin 2 and partitioned by a dashpanel 3, and an engine 5 is installed in the engine room 4. In the driver's seat of the cabin 2, a steering wheel 6 is disposed and is supported to an instrument member 7. The automobile 1 further includes a steering wheel shaft 8 (steering shaft) through which an operating force applied to the steering wheel 6 is transmitted to front wheels (not shown) of the automobile 1. The steering wheel shaft 8 passes through the dashpanel 3 to extend to the engine room 4, and is linked to a gearbox (not shown) fixed to the dashpanel 3.

A brake pedal 11 has an end portion 11a and the other end portion 11b. The brake pedal 11 is rotatably supported to a pedal support shaft 27 (as described later) at the end portion 11a. The end portion 11b is operated by a driver of the automobile 1.

Furthermore, a master vac 9 that is disposed in the engine room 4 is fixed to the dashpanel 3. An input shaft (operating rod) 10 of the master vac 9 passes through the dashpanel 3 to penetrate into the cabin 2, and a front end of the input shaft 10 is connected to a connecting portion 11c of the brake pedal 11. As shown, the connecting portion 11c is located between the end portions 11a and 11b.

Hereinafter, the structure for supporting the brake pedal 11 (i.e., the pedal support structure according to the embodiment of the present invention) will be described with reference to FIGS. 2 through 5. The pedal support structure includes a first pedal bracket 20 fixed to the dashpanel 3 (see FIG. 2). As can be seen from FIG. 3, the first pedal bracket 20 is formed into a U-shape that is opened downward and toward a rear section of an automobile body. The first pedal bracket 20 includes side walls 21, 21, and a connecting plate 22 extending between both the side walls 21, 21 is welded to rear ends thereof (i.e., ends thereof located closer to the rear section of the automobile body). The first pedal bracket 20 is provided, at upper ends of both the side walls 21, 21 thereof, with a ceiling wall 23 that extends between both the side walls 21, 21 (see FIGS. 3 and 4).

Figure 3:
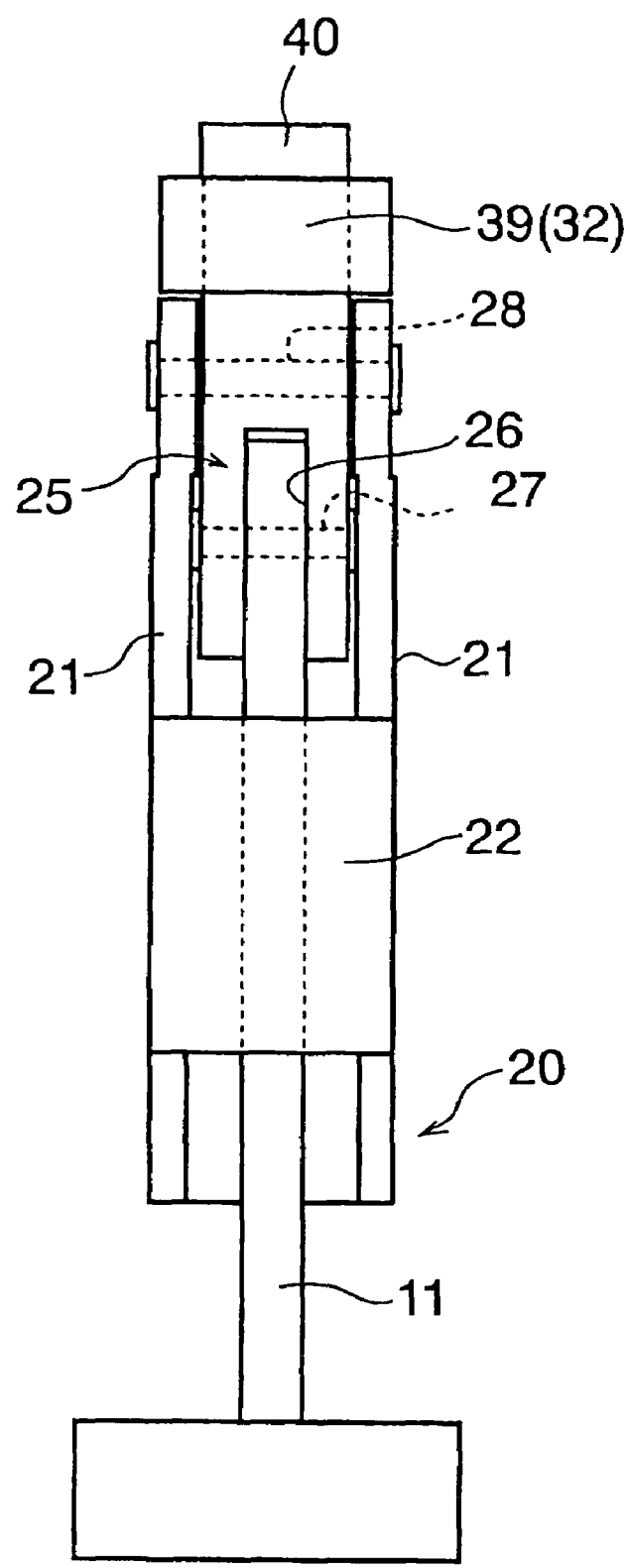
FIG. 3 is a front view of the pedal support structure as viewed in the direction of the arrow III in FIG. 2.
Figure 4:
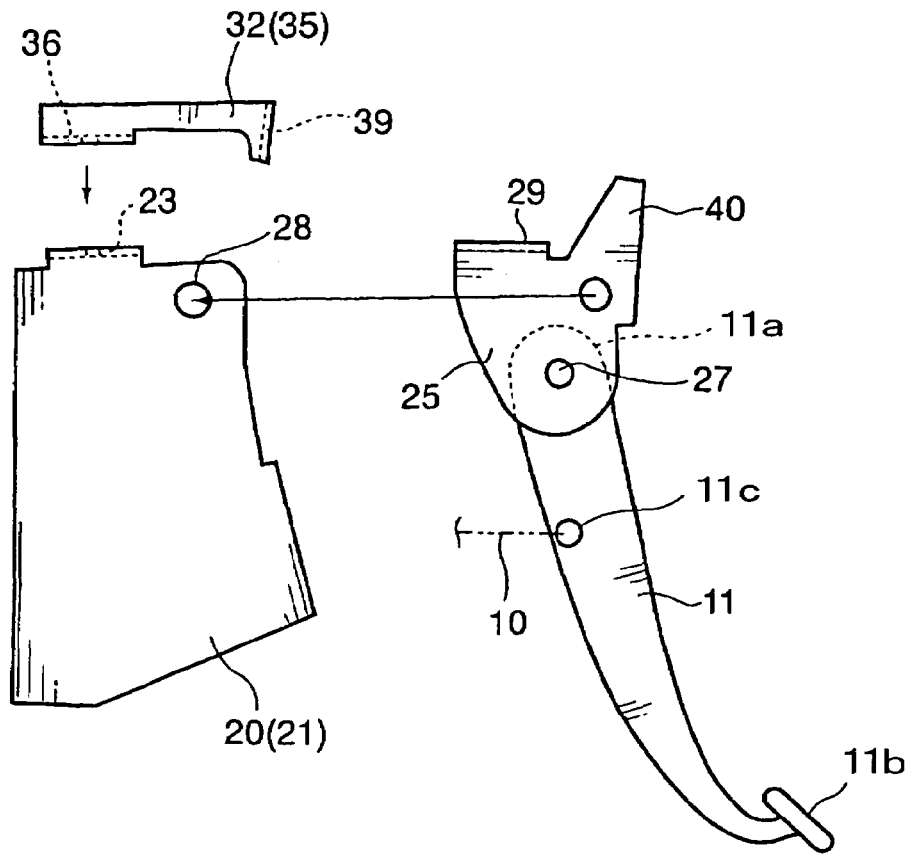
FIG. 4 is an exploded side view of the pedal support structure.

Referring to FIG. 3 in particular, the first pedal bracket 20 contains, at its upper end part, a second pedal bracket 25, and the second pedal bracket 25 includes, at its lower end part, a slit 26. As shown in FIG. 3, the pedal support shaft 27 extending in a widthwise direction of the automobile is fixed to the second pedal bracket 25, and the brake pedal 11 is rotatably supported to the pedal support shaft 27, with an upper end of the brake pedal 11 contained in the slit 26. The pedal support shaft 27 is located above the steering wheel shaft 8 at a great distance therefrom.

Figure 2:
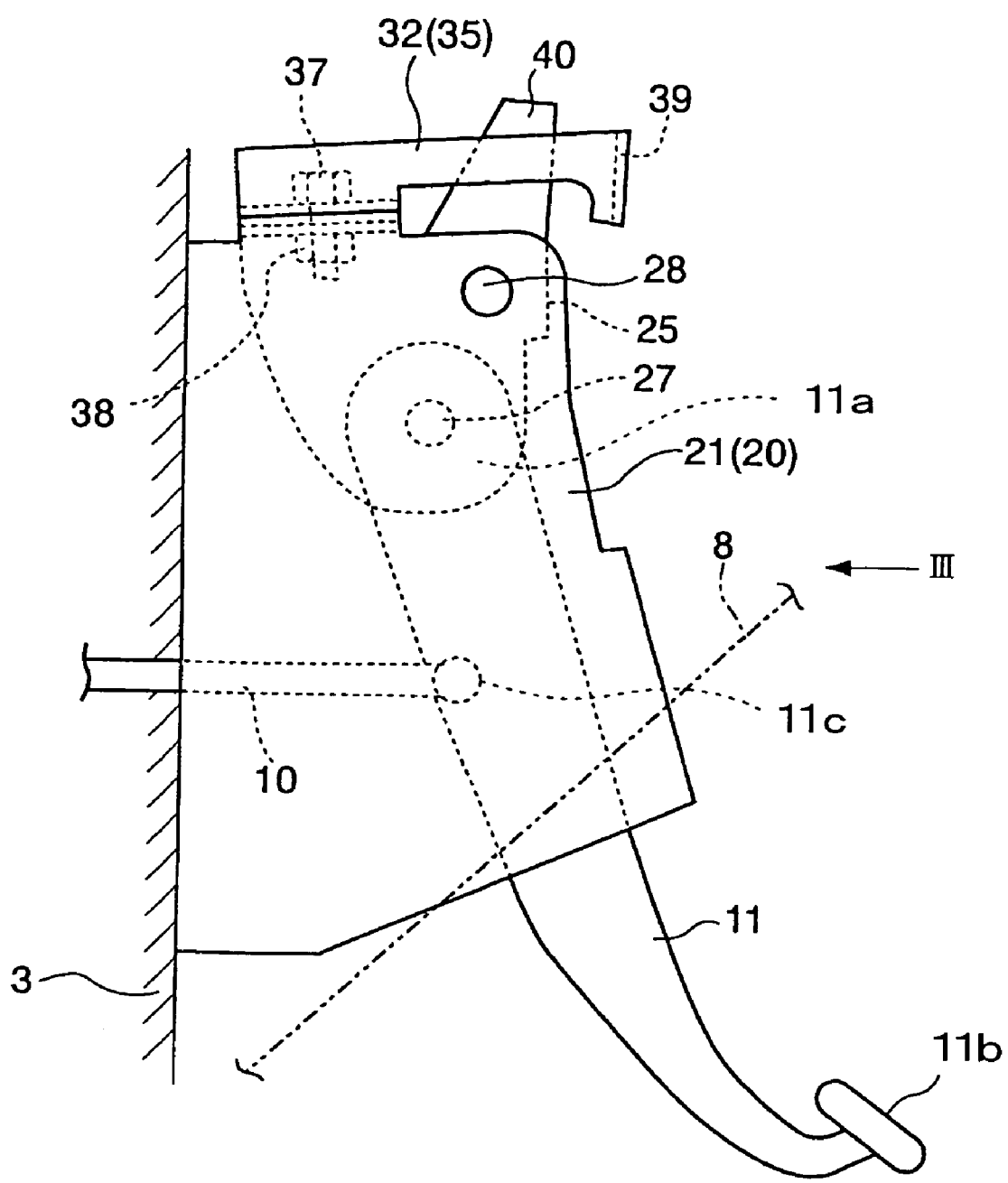
FIG. 2 is a side view of the pedal support structure.

Next, referring to FIG. 2 in particular, the second pedal bracket 25 is rotatably supported to a bracket support shaft 28 that is located at an upper rear corner of the first pedal bracket 20 and extends in the widthwise direction of the automobile. The bracket support shaft 28 for supporting the second pedal bracket 25 so that the second pedal bracket 25 can swing upward and downward is provided at a position located upwardly and backwardly of the pedal support shaft 27 that is the center of rotation of the brake pedal 11.

The second pedal bracket 25 includes a ceiling wall 29. When the second pedal bracket 25 is positioned within the first pedal bracket 20, the ceiling wall 29 of the second pedal bracket 25 is positioned below the ceiling wall 23 of the first pedal bracket 20, with the ceiling wall 29 overlapped with the ceiling wall 23 of the first pedal bracket 20.

Figure 5:
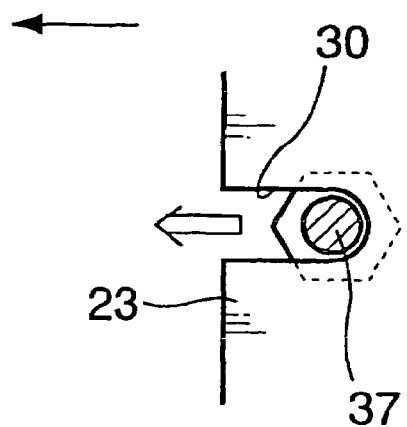
FIG. 5 is a diagram for illustrating an elongated hole formed in a first pedal bracket.

Although FIG. 5 shows only the ceiling wall 23 of the first pedal bracket 20 for reasons of drawing simplicity and clarity, an elongated hole 30 opened toward the front of the automobile is formed in each of the ceiling walls 23 and 29 of the first and second pedal brackets 20 and 25.

Located on the ceiling wall 23 of the first pedal bracket 20 is a restricting and derestricting member 32 that extends horizontally backward to be in the vicinity of the instrument member 7. A front-end portion of the restricting and derestricting member 32 is formed into a U-shape in cross section which includes both side walls 35, and is fixed to the ceiling walls 23 and 29 of the first and second pedal brackets 20 and 25 by using a bolt 37 passing through a bolt-insertion hole (not shown) formed in a bottom wall 36 of the front-end portion of the restricting and derestricting member 32. To be more specific, the bolt 37 passes through the bolt-insertion hole of the bottom wall 36 of the front-end portion of the restricting and derestricting member 32, the elongated hole 30 of the ceiling wall 23 of the first pedal bracket 20, and the elongate hole (not shown) of the ceiling wall 29 of the second pedal bracket 25. And a nut 38 located at the lower face of the ceiling wall 29 of the second pedal bracket 25 is tightened, and thus the restricting and derestricting member 32 and the first and second pedal brackets 20 and 25 are fixed to each other while they are fastened together. As a result, the second pedal bracket 25 is fixed to the first pedal bracket 20, and swinging of the second pedal bracket 25 is restricted.

Both the side walls 35 of the restricting and derestricting member 32 extend backward, and rear ends of both the side walls 35 are provided with a rear end wall 39 extending between both the side walls 35, 35. In a space defined by both the side walls 35, 35 and the rear end wall 39, an arm 40 extending upward from a rear end of the second pedal bracket 25 is contained. The top of the arm 40 is located above the restricting and derestricting member 32, and the arm 40 and a rear end face of the second pedal bracket 25 are located face-to-face with the instrument member 7.

The reference characters (I) through (V) added to FIGS. 6 and 7 show time-series operations upon collision. First, the above-described pedal support structure is usually subjected to a brake operation performed by a driver in a normal state shown in FIGS. 2 and 6(I). FIG. 6(II) shows the state in which the dashpanel 3 is deformed backward upon collision, the first pedal bracket 20 is moved relatively backward, and the rear end wall 39 of the restricting and derestricting member 32 is accordingly hit against the instrument member 7 that is a component of the automobile body.

As can be understood from FIG. 6(II), since the rear end wall 39 of the restricting and derestricting member 32 is located face-to-face with the instrument member 7 that is a component of the automobile body, the rear end wall 39 constitutes an abutment part that hits against the instrument member 7 first upon collision. The further backward movement of the restricting and derestricting member 32, which results from the displacement of the first pedal bracket 20 due to the deformation of the dashpanel 3 upon collision, is prevented because the rear end wall 39 of the restricting and derestricting member 32 is received by the instrument member 7. Furthermore, as a result of the prevention of the further backward movement of the restricting and derestricting member 32, the restricting and derestricting member 32 is forced to move relatively forward with the bolt 37 (see FIG. 7(III)).

FIG. 7 (IV) shows the state in which the dashpanel 3 is deformed further backward. As shown in FIG. 7(IV), the bolt 37 is escaped from the elongated holes 30 (shown in FIG. 5) of the first and second pedal brackets 20 and 25 by the relative forward movement of the restricting and derestricting member 32, and thus a restraint imposed by the restricting and derestricting member 32 is released. That is, the second pedal bracket 25 is not fixed to the first pedal bracket 20 any more, and the second pedal bracket 25 is released from the first pedal bracket 20. As a result, the second pedal bracket 25 can be swung on the bracket support shaft 28. Furthermore, with the escape of the bolt 37 from the elongated holes 30, a rear end of the restricting and derestricting member 32 springs up, thus exposing the arm 40 of the second pedal bracket 25. FIG. 7(V) shows this state.

Therefore, the restricting and derestricting member 32, the bolt 37 and the nut 38 constitute a locking device (restricting means) that restricts the swinging of the second pedal bracket 25 with respect to the first pedal bracket 20 at normal times, and that derestricts the swinging of the second pedal bracket 25 by abutting against the instrument member 7 when the dashpanel 3 is deformed backward upon collision of the automobile.

Referring to FIG. 7(V), after the completion of derestricting operation of the restricting and derestricting member 32, the instrument member 7 directly acts upon the arm 40 of the second pedal bracket 25, and thus a force is further applied to the second pedal bracket 25 such that the second pedal bracket 25 is rotated about the bracket support shaft 28 in the direction in which the pedal support shaft 27 is displaced relatively backward.

Accordingly, a series of operations upon collision is as follows. First, the rear end wall 39 of the restricting and derestricting member 32 is hit against the instrument member 7 (see FIG. 6(II)), the derestricting operation of the restricting and derestricting member 32 is started (see FIGS. 6(II) through 7(III)), the derestricting operation of the restricting and derestricting member 32 is completed (see FIG. 7(IV)), and then the instrument member 7 directly acts upon the arm 40 of the second pedal bracket 25 to start the swinging operation of the second pedal bracket 25. Thus, the pedal support shaft 27 is displaced relatively backward, thereby making it possible to protect a knee of the driver from a collision load.

In particular, the end portion 11a of the brake pedal 11 is displaced relatively backward. Then, the brake pedal 11 is connected to the master vac 9 via the shaft 10 at the connecting portion 11c. Accordingly, the brake pedal 11 rotates clockwise as indicated by the arrow A in FIG. 7(V) about the connecting portion 11c, thereby protecting the knee of the driver from the collision load.

As a result of the above-described operations, the knee of the driver who is performing a brake operation at the time of collision can be protected from the collision load because the pedal support shaft 27 is displaced relatively backward upon collision to rotate the brake pedal 11 clockwise as shown in FIG. 7(V).

Besides, in the pedal support structure of the present embodiment, the bracket support shaft 28 is located above the pedal support shaft 27. Therefore, it is possible to avoid the situation where the bracket support shaft 28 interferes with the steering wheel shaft 8 that is easily displaced upon collision, which prevents the swinging of the second pedal bracket 25. Consequently, it is possible to ensure the operational reliability of the pedal support structure.

Moreover, the arm 40 of the second pedal bracket 25 is located toward the front of the automobile body away from the rear end wall 39 (abutment part) of the restricting and derestricting member 32. Thus, after the restricting and derestricting member 32 has derestricted the second pedal bracket 25, the instrument member 7, which is a component of the automobile body, acts upon the second pedal bracket 25. As a result, the swinging operation of the second pedal bracket 25, i.e., the relative backward displacement of the pedal support shaft 27, can be ensured. In other words, if the pedal support structure is designed such that the derestricting operation of the restricting and derestricting member 32 and the swinging operation of the second pedal bracket 25 are carried out together, these two operations might interfere with each other, and thus the swinging operation of the second pedal bracket 25 might not be carried out well.

Although the preferred embodiment of the present invention has been described thus far by taking the brake pedal 11 as an example, the pedal support structure may similarly be applied to a clutch pedal or a foot-operated parking brake pedal.

What is claimed is:

1. An automotive pedal support structure in which an operating pedal is attached via brackets to a dashpanel serving as a partition between an engine room and a cabin, the automotive pedal support structure comprising:

a first pedal bracket fixed to the dashpanel;

a bracket support shaft provided at an upper part of the first pedal bracket to extend in a widthwise direction of an automobile;

a second pedal bracket swingably attached to the first pedal bracket via the bracket support shaft;

a pedal support shaft that is provided at the second pedal bracket and located below the bracket support shaft and above a steering shaft in side view to extend parallel to the bracket support shaft;

the operating pedal swingably attached to the second pedal bracket via the pedal support shaft; and a restricting and derestricting member that connects the first pedal bracket with the second pedal bracket with a bolt passing through an elongated hole that extends in a backward and forward direction of the automobile that each front-end portion of the first and second pedal brackets is open to restrict the swinging of the second pedal bracket, and that derestricts the swinging of the second pedal bracket by having the bolt pass through the hole to a forward position thereof, wherein the restricting and derestricting member has an abutment part located at a forward position of an automobile body component and away from the automobile body component and facing the automobile body component, the second pedal bracket has the arm located at a forward position of the automobile body component and away from the automobile body component and facing the automobile body component, the distance between the automobile body component and the arm being larger than the distance between the automobile body component and the abutment part, when the dashpanel is deformed backward upon collision of the automobile and the restricting and derestricting member is moved backward together with the first and second pedal brackets, the abutment part hits against the automobile body component prior to the arm, so that the backward movement of the restricting and derestricting member is prevented and the bolt moves the elongated hole relatively forward, and the bolt passes through the hole, so that the restricting and derestricting member derestricts the second pedal bracket, and after the restricting and derestricting member has derestricted the second pedal bracket, the arm allows the swinging of the second pedal bracket by hitting against the automobile body component.

2. The automotive pedal support structure of claim 1, wherein the automobile body component serves as an instrument member.

* * * * *